Patented Dec. 13, 1927.

1,652,162

UNITED STATES PATENT OFFICE.

HARRY E. BROOKBY, OF EVANSTON, ILLINOIS, ASSIGNOR TO UNITED STATES GYPSUM COMPANY, OF CHICAGO, ILLINOIS, A CORPORATION OF ILLINOIS.

MOLDED STRUCTURAL UNIT AND PROCESS OF PRODUCING THE SAME.

No Drawing.   Application filed March 19, 1923.   Serial No. 626,248.

This invention relates to improvements in building materials and more particularly to molded structural units of gypsum.

It is the object of this invention to produce from ground uncalcined gypsum structural units such as roof tile, floor tile, partition tile, plaster board and the like, which may be reinforced if desired, and may or may not contain fiber or other aggregates.

In the past such products have been made from ground gypsum after the gypsum has been calcined and in their manufacture have utilized the well known setting action of calcined gypsum, or plaster of Paris, when mixed with water. This invention constructs these products from the natural gypsum rock as mined and ground without the necessity of first calcining the gypsum, or forming plaster of Paris, thereby eliminating the cost of calcining kettles and the calcining treatment of the gypsum, and the products constructed in accordance with this invention are of much greater density and structural value than the products of calcined gypsum mixed with water and then set.

The accepted theory of the setting of calcined gypsum, or plaster of Paris, is in the higher water solubility of plaster of Paris as opposed to that of the fully hydrated gypsum, so that a mixture of paster of Paris and water rapidly becomes supersaturated to the fully hydrated gypsum crystal, and thus these are deposited from solutions in an interlocking, or technically known as twining state, until the whole mixture solidifies to the shape or mass of so called "set gypsum". The strength of such masses of "set" gypsum or "set" plaster of Paris depends largely upon the ratio of mixing water to plaster of Paris, and the amount of agitation of this mix, which of course affects the density of the set mass, the excess mixing water simply being dried out and thus leaving pores or voids.

I have noticed that raw gypsum or the natural mineral gypsum possesses greater solubility in water if the pressure upon the water surrounding it is increased. By raw or natural mineral gypsum, I mean the hydrated calcium sulphate found in natural rock form, known chemically as $CaSO_4.2H_2O$. The solubility of the raw gypsum, however, decreases as temperature increases. Consequently, by application of pressure alone and keeping temperature constant in molding articles of raw ground gypsum in the presence of water, I am able to make gypsum go into solution to such an extent, that the twining and interlocking action of the crystal takes place, very similar to the action of calcined plaster of Paris when it sets with water. In addition, the products made out of raw gypsum under pressure have much higher structural value and more fire resisting property because they are denser, and because the amount of mixing water necessary to wet such particles of ground raw gypsum is very much less than the amount required to wet up and mix to the fluid consistency for casting plaster of Paris or calcined gypsum. Hence, the articles made from raw gypsum with just a dampening amount of water present must necessarily be much denser than those made out of plaster of Paris.

I have also noticed that some chemicals like sodium thiosulphate, common salt, and other substances, which in solution in water increases the solubility of raw gypsum, act as positive catalyzers in pressure "setting" action, and tend to produce stronger articles because they enable the gypsum to go into solution much faster under pressure application. At the same time such articles molded under the pressure through the incorporation of flowers or sulphur, naphthaline, various resinous matters, paraffin, or stearic acid, become waterproof and are thus much more resistant to weather influences.

In practicing my process, I grind the raw gypsum so that it practically all passes a 40 mesh screen, say 95%. At the same time 75% passes a 100 mesh screen. I next mix this raw ground gypsum in a pug mill or other suitable mixer, which may be by the batch process or by the continuous process, with about 10% to 15% of its weight of water. This amount of water varies with different gypsums, and varies with the pressure that I want to apply on the particular structure to be molded. But at any rate, only sufficient water is added to make the ground gypsum a slightly damp mass, so that a fairly loose powdery mass is formed. At the time of mixing the water and ground gypsum in the pug mill, I may add organic aggregate, such as excelsior, fibre, sawdust or shavings, or inorganic aggregate such as sand, crushed stone or other minerals, depending upon the kind of structural units desired. From the pug mill or mixer, the mix is conveyed to the mold, and the mold filled to the desired height and the pressure applied. The pressure to be applied depends upon the density and strength desired, but in most cases, I find it necessary to go above 6,000 pounds per square inch, and sometimes as high as 10,000 pounds per square inch. However, I wish it understood, that I do not limit myself as to the pressures to be employed, because there are many variables affecting these pressures. The point I wish to convey is, given a definite fineness of the raw gypsum and a definite amount of water present in the system, there is a corresponding pressure which can be applied to make this mass set up into a structural unit or other molded units of very high structural value.

I do not wish to limit myself in the application of this method as to the batch process or in unit molds, but if preferred, such articles can be molded by a continuous process through forming dies, and in subsequent units cut as molded, after the order of making clay products. Nor do I wish to limit this invention to any specific form of mold because, with the exception of plaster board, gypsum products are cast in the usual manner and pressure may be applied to the customary molds during the casting, strengthening such molds if necessary, however, as plaster board is usually enveloped or covered on the sides with paper and is not cast in the same manner as other gypsum products.

What I claim is:

1. An article of manufacture consisting of natural gypsum mixed and water and molded under pressure.

2. A molded article consisting of raw gypsum having an interlocking crystalline structure.

3. An article having a dense interlocking crystalline structure consisting of raw gypsum dampened with water and molded under pressure.

4. A waterproofed article of manufacture composed of natural gypsum with a waterproofing agent incorporated therein, mixed with water, and molded under pressure.

5. A waterproofed article having a dense interlocking crystalline structure consisting of raw gypsum with a waterproofing agent incorporated therein, dampened with water, and molded under pressure.

6. The process for forming articles of natural gypsum which consists in the grinding of gypsum rock, the addition of water to the ground gypsum, and the molding of the wet gypsum under pressure.

7. The process of molding articles of gypsum consisting in the grinding of raw gypsum, forcing the ground gypsum into solution by application of pressure in a mold, and removing the excess water.

8. The process of forming gypsum articles consisting in forcing uncalcined gypsum into solution with water in a mold by the application of pressure until interlocking crystals are formed, and allowing the excess moisture to evaporate.

9. The process for forming articles of natural gypsum comprising grinding of gypsum rock, the addition of water and a catalytic agent to the ground gypsum, and the molding of the wet gypsum under pressure.

10. The process of forming gypsum articles comprising forcing uncalcined gypsum into solution with water and a catalytic agent in a mold by the application of pressure until interlocking crystals of gypsum are formed, and allowing the excess moisture to evaporate.

11. The process for forming articles of natural gypsum consisting in the grinding of gypsum rock, the addition of water and a waterproofing agent flowable under pressure to the ground gypsum, and molding of the wet gypsum under pressure.

12. The process of molding articles of gypsum consisting in the grinding of raw gypsum forcing the ground gypsum into solution by application of pressure in a mold with a waterproofing agent flowable under pressure and removing the excess water.

13. The process of molding gypsum articles consisting in applying to uncalcined gypsum and water in a mold with a waterproofing agent flowable under pressure of sufficient pressure to produce an interlocking crystalline structure to the gypsum amalgamated with the waterproofing agent, maintaining the temperature constant during the application of pressure by an excess of water, and allowing the excess water to evaporate.

14. The process of molding gypsum articles comprising applying to uncalcined ground gypsum, water, a catalytic agent, and a waterproofing agent in a mold of sufficient pressure to produce an interlocking crystalline structure to the gypsum amalgamated with the waterproofing agent, and allowing the excess water to evaporate.

15. A molded article consisting of raw uncalcined gypsum ground and dampened with water and incorporated with a waterproofing under pressure in a mold, the gypsum crystals interlocking in a twining action to produce a dense crystalline structure.

HARRY E. BROOKBY